United States Patent [19]

Sakakibara et al.

[11] 4,143,911
[45] Mar. 13, 1979

[54] SEAT WALK-IN DEVICE FOR AUTOMOBILES

[75] Inventors: Yosihiro Sakakibara, Iwakura; Takeshi Awano, Okazaki, both of Japan

[73] Assignees: Mitsubishi Jidosha Kogyo Kabushiki Kaisha; Kabushiki Kaisha Imasen Denki Seisakusho, both of Japan

[21] Appl. No.: 847,607

[22] Filed: Nov. 1, 1977

[30] Foreign Application Priority Data

Nov. 4, 1976 [JP] Japan .................. 51/148493

[51] Int. Cl.² .................. A47C 1/02; B60N 1/02
[52] U.S. Cl. .................. 297/341; 296/65 R
[58] Field of Search ............... 297/341, 379; 248/393; 296/65 R

[56] References Cited

U.S. PATENT DOCUMENTS

| 3,811,726 | 5/1974 | Masakazu et al. | 297/341 |
| 3,822,914 | 7/1974 | Iida | 297/379 X |
| 3,931,995 | 1/1976 | Arai | 297/341 |
| 3,940,182 | 2/1976 | Tamura | 297/341 |

FOREIGN PATENT DOCUMENTS 47-39764  12/1972  Japan.

Primary Examiner—James T. McCall
Attorney, Agent, or Firm—Robert E. Burns; Emmanuel J. Lobato; Bruce L. Adams

[57] ABSTRACT

In a front seat of an automobile having a seat back tiltable with respect to the seat cushion, a seat walk-in device, which moves interlockingly with the tilting of the seat cushion, is interposed between a stationary rail fixed on the automobile's floor and a sliding rail fixed under the seat cushion. To provide adequate space for entering or leaving the rear-seat space, the front seat is moved toward the front of the automobile by tilting the seat back forward. On completion of the entering or leaving, the front seat is moved backward after returning the seat back to an upright position. Then, the seat walk-in device automatically locks the front seat in a predetermined position.

8 Claims, 5 Drawing Figures

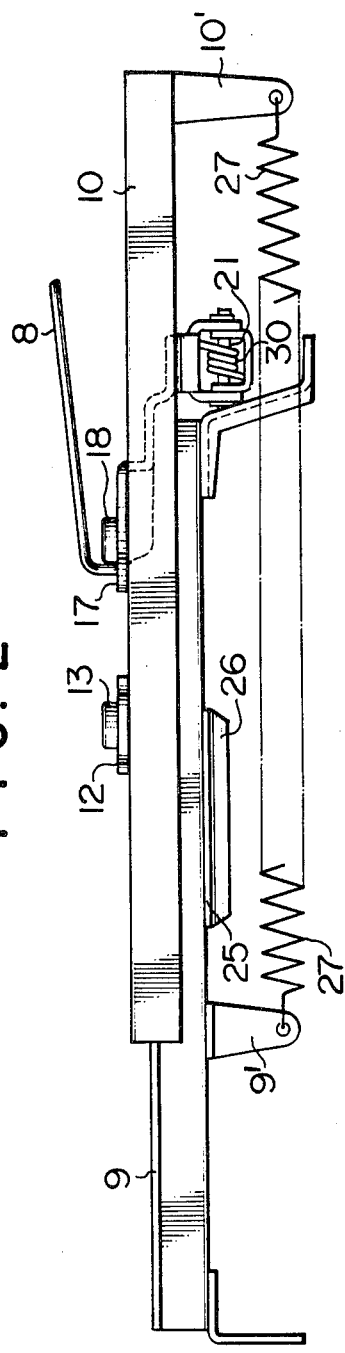
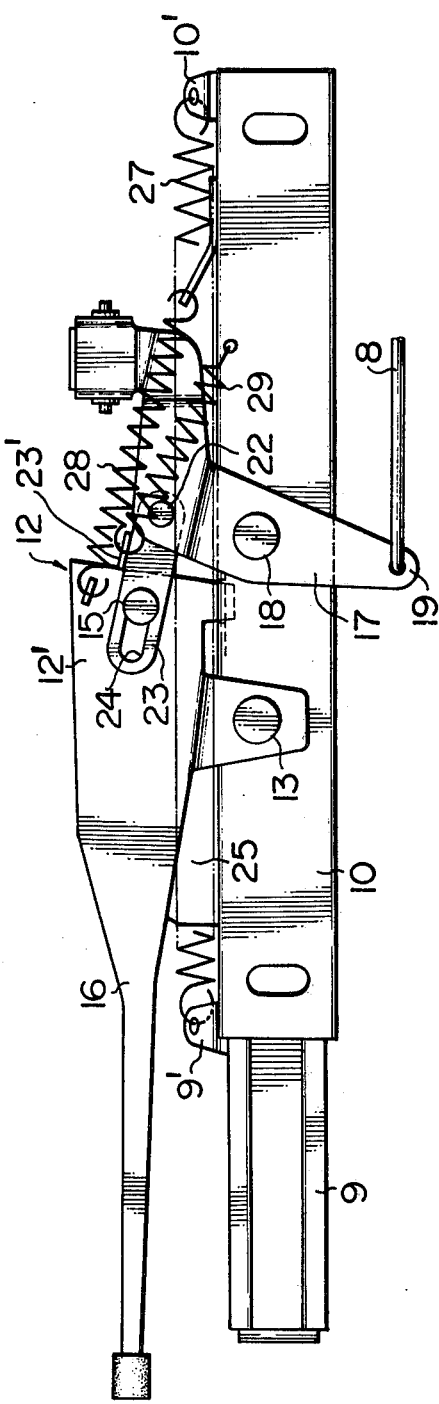

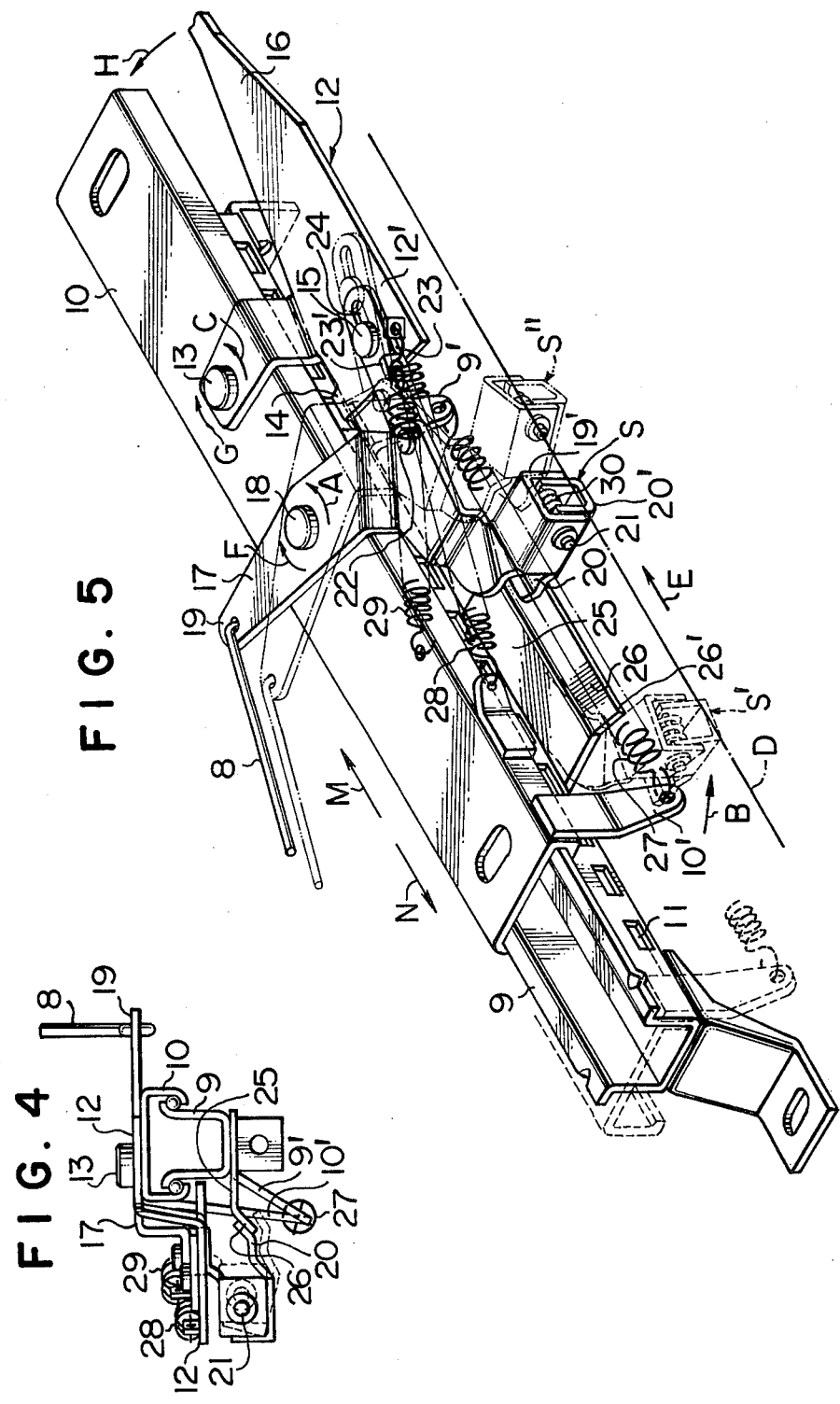

SEAT WALK-IN DEVICE FOR AUTOMOBILES

DETAILED DESCRIPTION OF THE INVENTION

This invention relates to a seat walk-in device for use with a seat of an automobile, and more particularly of a two-door automobile.

When a passenger of the rear seat of a two-door automobile gets in and out, it is a common practice to facilitate the action by sliding the seat rail of a seat walk-in device by tilting forward the seat back of a front seat.

But conventional seat walk-in devices have involved a problem that the front sitter must readjust the position of the front seat by moving the seat rail considerably when the rear sitter has got in or out.

SUMMARY OF THE INVENTION

This invention has been completed, based on the research and development to overcome such problem with the conventional seat walk-in devices. The object of this invention is to provide a seat walk-in device for automobiles with a front seat adjuster having a seat back tiltably fitted to a seat cushion, a sliding rail longitudinally fixed under the seat cushion, a stationary rail adapted to engage with the sliding rail and fixed on the automobile's floor and a seat position adjusting lock lever pivotally fitted to the sliding rail so as to releasably engage with a lock hole formed in the stationary rail, which comprises a control lever pivotally fitted to the sliding rail so as to rotate interlockingly with the tilting of the seat back, spring engaging means fitted to the free end of the rotating control lever so as to releasably engage with a guide member fixed to the stationary rail, a link piece pivotally interposed through pin members between the control lever and the lock lever and at least a spring member urging the lock lever constantly to rotate toward the lock hole and the spring engaging means on the control lever constantly toward the guide member, wherein on tilting forward the seat back, the lock lever is released from the lock hole in the stationary rail through the control lever and link piece against the urging force of the spring member to cause the sliding rail to slide, together with the seat cushion, toward the front of the automobile to increase the entering or leaving space for the rear sitter, and wherein on sliding the seat cushion backward, the lock lever automatically engages with the lock hole, urged by the spring member, when the spring engaging means has moved to a predetermined position guided by the guide member. With this seat walk-in device, accordingly, the front seat becomes locked in the predetermined position, and can be moved to a desired position therefrom, when the front sitter slides the seat cushion backward on completion of the entering or leaving of the rear sitter. This mechanism is convenient, especially when a different person takes the front seat.

BRIEF DESCRIPTION OF THE DRAWINGS

Now, the construction, operation and result of this invention will be described in detail by reference to an embodiment thereof illustrated in the accompanying drawings, in which:

FIG. 2 is a front view showing only the seat rail portion of FIG. 1.

FIG. 3 is a plan view of the portion shown in FIG. 2.

FIG. 4 is a side elevation of the portion shown in FIG. 2.

FIG. 5 is a perspective view showing only the seat rail in FIG. 1.

DESCRIPTION OF THE PREFERRED EMBODIMENT

Figure 1:
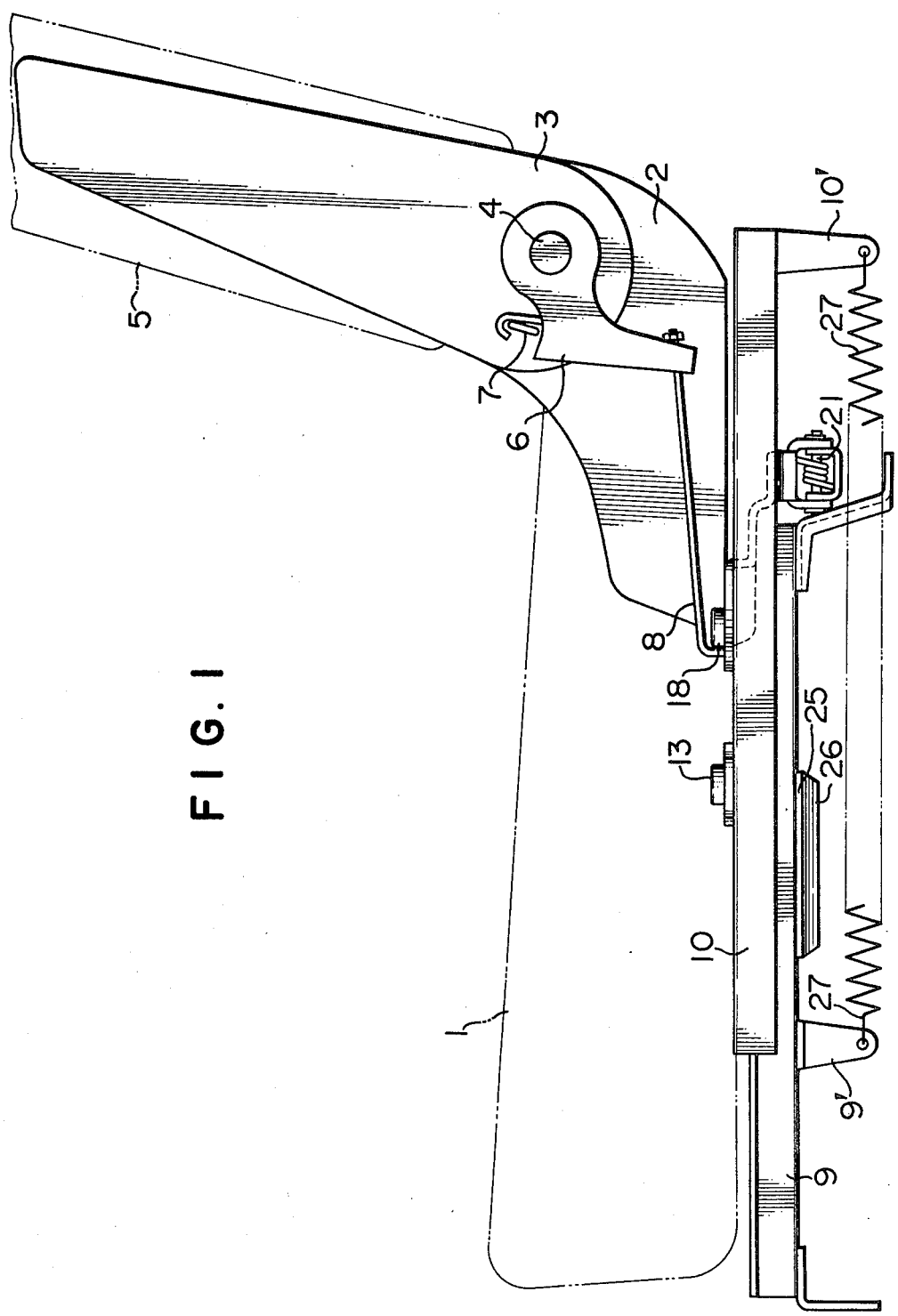
FIG. 1 is a schematic front view showing an embodiment of this invention.

First, the construction of the seat walk-in device according to this invention will be described. Reference numeral 1 designates a seat cushion fixed with a side metal fitting 2 of a reclining device on each side of its rear portion. Reference numeral 3 denotes a tiltable side metal fitting that is fixed to a seat back 5 so as to be rotatable about a shaft 4 fixed to the side metal fitting 2. Reference numeral 6 designates a plate that is rotatable about the shaft 4 and pulls a rod 8 when the tiltable side metal fitting 3 tilts forward, depressed by a projection 7 fixed thereto.

Reference numeral 9 indicates a stationary rail fixed to the floor of the automobile and engages with a sliding rail 10 fixed under the seat cushion 1. Reference numeral 11 denotes a lock hole made in one side of the stationary rail 9. Reference numeral 12 designates a lock lever that is rotatable about a pin 13 on the sliding rail 10. The base 12' thereof forms a lock section 14 engaging with the lock hole 11. The lock lever 12 has an operating lever section 16 that extends forward as well as a pin 15. Thus a front seat adjuster comprises the seat back 5 tiltably fitted to the seat cushion 1, the sliding rail 10 longitudinally fixed under the seat cushion 1, the stationary rail 9 adapted to engage with the sliding rail 10 and fixed on the automobile's floor and the seat position adjusting lock lever 12 pivotally fitted to the sliding rail 10 so as to releasably engage with the lock hole 11 formed in the stationary rail 9.

Reference numeral 17 indicates a bell-crank control lever rotatable about a pin 18, the one end of which forms a lever section 19 engaging with the rod 8 and the other end carries spring engaging means S engaging with a guide plate to be described later. The spring engaging means S is constructed as follows: Reference numeral 19' denotes an inverted-U section formed by bending the end of the control lever 17. Item 20 is a contact piece having a U-shaped base 20'. This contact piece 20 is inserted in the inversed-U section 19', with a horizontal shaft 21 being longitudinally passed therethrough, so as to be rotatable about the shaft 21. Reference numeral 30 denotes a spring on the outside of the shaft 21 that constantly urges the contact piece 20 to turn upward. Reference numeral 23 designates a link piece that is formed with a slot 24 and interposed between the control lever 17 and the lock lever 12. One end of the link piece 23 is pivotally fitted to the control lever 17 with a pin 22, and the pin 15 at the base 12' of the lock lever 12 engages with the slot 24 in the opposite end thereof. Reference numeral 25 denotes a guide plate horizontally extending from below the stationary rail 9. The longitudinal edge of the guide plate 25 bends downward to form a receiving section 26. Reference numeral 27 represents a coil spring provided between a bracket 10' on the side of the sliding rail 10 and a bracket 9' on the side of the stationary rail 9, so as to urge the sliding rail 10 to slide forward. Reference numeral 28 indicates a coil spring between the sliding rail 10 and the lock lever 12, which urges the lock section 14 of the lock plate 12 toward the lock hole 11. Reference numeral 29 designates a coil spring between the sliding rail 10 and the bent section 23' of the link piece 23, which urges the contact piece 20 of the control lever 17, through the link piece 23, to rotate toward the stationary and sliding rails.

Next, the operation and result of the seat walkin device thus constructed will be described. When the seat back 5 of the front seat is tilted forward to provide a space for the rear sitter to get in or out, the projection 7 fixed to the tiltable side metal fitting 3 depresses the plate 6 to cause its rotation about the shaft 4, whereby the rod 8 is pulled backward. Then, as shown in FIG. 5, the control lever 17, pulled by the rod 8, rotates about the pin 18 in a direction indicated by the arrow A. Consequently, the spring engaging means S on the control lever 17 rotates from the dotted position S', as indicated by the arrow B. At the same time, the lock lever 12, which is connected through the link piece 23 to the control lever 17, also rotates about the pin 13 in a direction indicated by the arrow C, whereby the lock section 14 of the lock lever 12 is released from the lock hole 11. On sliding the sliding rail 10 toward the front of the automobile (i.e., in a direction indicated by the arrow M in FIG. 5), the spring engaging means S having the contact piece 20 moves in a direction indicated by the arrow E, along the sliding line D, to a position S" indicated by a double-dot-dash line. As a consequence, the space through which a passenger takes or leaves the rear seat, not shown, becomes enlarged.

When the passenger has taken or left the rear seat, the seat 1 is returned to the original position, as described below. First, the seat back 5 is raised to the upright position. By the action of the springs 28 and 29, the control lever 17 rotates about the pin 18 in a direction of the arrow F, in such a manner as to return the rod 8 to the original position. Thereupon, the contact piece 20 comes in contact with the receiving section 26 of the guide plate 25 (as shown by a solid line in FIG. 5). In this state, however, the lock section 14 of the lock lever 12 does not engage with the lock hole 11, restrained by the link piece 23. On moving the sliding rail 10 backward, the contact piece 20 moves backward (in a direction of the arrow N in FIG. 5), while contacting the receiving section 26, and eventually clears the rear end 26' thereof. Then, by the action of the springs 28 and 29, the control lever 17 rotates about the pin 18 and, simultaneously, the lock lever 12 about the pin 13 back to their original positions, traveling in directions indicated by the arrows F and G, respectively. Consequently, the lock section 14 of the lock lever 12 automatically fits in the lock hole 11, whereby the seat cushion 1 is automatically returned and locked in a predetermined standard position. The above description assumes that the contact piece 20 is in position S' indicated by a dotted line in FIG. 5 before the seat back 5 is tilted forward. When the lock section 14 is released from the lock hole 11, by working the operation lever section 16 as described later, and the sliding rail 10 is thus moved forward in the direction M, while the spring engaging means S is in the dotted-lined position S', the front end of the contact piece 20 goes into the reverse side of the receiving section 26. When the contact piece 20 is on the reverse side of the receiving section 26, this device operates as follows: On tilting forward the seat back 5, the control lever 17 is rotated through the rod 8 in the direction A and, accordingly, the front end of the contact piece 20 travels onto the slide line D, after sliding out below the receiving section 26 against the force of the spring 30. Hereafter, the device operates in the same manner as described before.

If the returned seat cushion 1 in the standard position does not fit the passenger, he can readjust its position as described below. On rotating the operating lever section 16 of the lock lever 12 in a direction H, the lock lever 12 turns about the pin 13 in the direction C, against the force of the springs 28 and 29, and the lock section 14 disengages from the lock hole 11. At this time, the pin 15 engaged with the slot 24 slides therein, and, therefore, the torque of the lock lever 12 is not transmitted to the link piece 23 and the control lever 17 does not rotate. By appropriately turning the operating lever section 16 backward after moving the sliding rail 10, together with the seat back 5, over the stationary rail 9, the seat cushion 1 is locked again.

In the above-described embodiment, the coil spring 29 is interposed between the sliding rail 10 and the link piece 23. But it may also be placed between the sliding lever 10 and the control lever 17.

As will be evident from the above description, the fulcrum (i.e., the pin 13) on which the lock lever 12 adjusting the longitudinal position of the seat turns and the fulcrum (i.e., the pin 18) on which the control lever 17 memorizing the standard seat setting position turns are separated. Therefore, the seat walk-in device of this invention can advantageously be employed in a two-door automobile. When the front sitter slides the seat cushion backward, after the rear sitter has taken or left the rear seat, the seat cushion is locked in a predetermined position and can be adjusted to a desired position if required. By hooking one end of the spring 29 on the link piece 23, jolting of the control lever 17 and the link piece 23 can be prevented. Further, the link piece 23 that actuates the lock lever 12 and control lever 17 interlockingly is pin-jointed. This arrangement permits a free selection of the fulcrums on which the levers rotate. By selecting a suitable lever ratio for each of the levers, therefore, their operating forces can be reduced and a smooth operation of the device results.

What is claimed is:

1. A seat walk-in device for automobiles with a front seat adjuster having a seat back tiltably fitted to a seat cushion, a sliding rail longitudinally fixed under the seat cushion, a stationary rail adapted to engage with the sliding rail and fixed on the automobile's floor and a seat position adjusting lock lever pivotally fitted to the sliding rail so as to releasably engage with a lock hole formed in the stationary rail, which comprises a control lever pivotally fitted to the sliding rail so as to rotate interlockingly with the tilting of the seat back, spring engaging means fitted to the free end of the rotating control lever so as to releasably engage with a guide member fixed to the stationary rail, a link piece pivotally interposed through pin members between the control lever and the lock lever and at least a spring member having one end hooked on said sliding rail and its other end hooked on at least one of said lock lever, said control lever and said link piece to urge the lock lever constantly to rotate toward the lock hole and the spring engaging means on the control lever constantly toward the guide member, wherein, on tilting forward the seat back, the lock lever is released from the lock hole in the stationary rail through the control lever and link piece against the urging force of the spring members to cause the sliding rail to slide, together with the seat cushion, toward the front of the automobile to increase the entering or leaving space for the rear sitter and, on sliding the seat cushion backward, the lock lever automatically engages with the lock hole, urged by the spring members, when the spring engaged means has moved to a predetermined position guided by the guide member.

2. A seat walk-in device for automobiles according to claim 1, wherein said spring member is interposed between the sliding rail and the link piece as a link spring member.

3. A seat walk-in device for automobiles according to claim 1, wherein said spring member is interposed between the sliding rail and the lock lever as a lock-lever spring member.

4. A seat walk-in device for automobiles according to claim 1, wherein said spring engaging means comprises a contact piece pivotally fitted to an end of the control lever with a longitudinally extending horizontal shaft and a spring urging the contact piece to rotate upward, so that the contact piece slides out from the reverse side of the receiving section of the guide member, traveling under the edge thereof, to the opposite side thereof, against the urging force of the spring, as the control lever rotates with the forward tilting of the seat back.

5. A seat walk-in device for automobiles according to claim 1, wherein the link piece is pivotally fitted by inserting a pin fixed to the lock lever into a slot formed in an end of the link piece.

6. A seat walk-in device for automobiles according to claim 1, wherein said spring member is interposed between the sliding rail and the control lever.

7. A seat walk-in device for automobile according to claim 1, wherein said spring member is interposed between the sliding rail and the lock lever and between the sliding rail and the link piece respectively.

8. A seat walk-in device for automobiles according to claim 1, wherein said spring member is interposed between the sliding rail and the lock lever and between the sliding rail and the control lever respectively.

* * * * *